United States Patent
Borton

(10) Patent No.: US 9,612,148 B2
(45) Date of Patent: Apr. 4, 2017

(54) SENSOR DETECTING MULTIPLE WEIGHTS OF MULTIPLE ITEMS

(71) Applicant: XEROX CORPORATION, Norwalk, CT (US)

(72) Inventor: Michael D. Borton, Ontario, NY (US)

(73) Assignee: Xerox Corporation, Norwalk, CT (US)

(*) Notice: Subject to any disclaimer, the term of this patent is extended or adjusted under 35 U.S.C. 154(b) by 501 days.

(21) Appl. No.: 14/185,606

(22) Filed: Feb. 20, 2014

(65) Prior Publication Data
US 2015/0233854 A1   Aug. 20, 2015

(51) Int. Cl.
| | |
|---|---|
| *G01N 27/04* | (2006.01) |
| *G01M 17/02* | (2006.01) |
| *G01G 19/02* | (2006.01) |

(52) U.S. Cl.
CPC .................. *G01G 19/024* (2013.01)

(58) Field of Classification Search
CPC .......... G01G 19/024; G01G 3/12–3/14; G01G 3/142; G01L 1/22; G01L 1/225; G01M 17/02; G01N 27/04; G01N 27/045
See application file for complete search history.

(56) References Cited

U.S. PATENT DOCUMENTS

| | | |
|---|---|---|
| 2,212,985 A | 8/1940 | Horni |
| 4,401,896 A | 8/1983 | Fowler et al. |
| 4,799,381 A * | 1/1989 | Tromp ............... G01G 19/024 177/211 |
| 4,839,480 A | 6/1989 | Bickley |
| 4,963,705 A | 10/1990 | Broderick et al. |
| 5,260,520 A | 11/1993 | Muhs et al. |
| 7,365,031 B2 | 4/2008 | Swallow et al. |
| 7,410,183 B2 | 8/2008 | Stowell et al. |
| 2010/0199760 A1 | 8/2010 | Seitz |

\* cited by examiner

*Primary Examiner* — Toan Le
(74) *Attorney, Agent, or Firm* — Gibb & Riley, LLC

(57) ABSTRACT

An apparatus includes: an elongated conductor (e.g., having a length dimension that is greater than its width dimension); an elongated resistor contacting the elongated conductor; and secondary conductors contacting the elongated resistor. The elongated resistor is positioned between the elongated conductor and the secondary conductors. A cover surrounds the elongated conductor, the elongated resistor, and the secondary conductors. The electrical resistance of the elongated resistor changes in proportion to an amount of force exerted upon the elongated resistor. The secondary conductors output electrical resistance measurements of corresponding areas of elongated resistor that the secondary conductors contact. A processor (that is operatively connected to the secondary conductors) automatically calculates the force applied to the elongated resistor based on the electrical resistance measurements output by the secondary conductors to produce different weight measurements. This allows the processor to automatically output the different weight measurements of the items applying force against the apparatus.

20 Claims, 4 Drawing Sheets

SENSOR DETECTING MULTIPLE WEIGHTS OF MULTIPLE ITEMS

BACKGROUND

Systems and methods herein generally relate to sensors that detect weight and to systems that can detect weight along a length of a sensor.

It is often important to be able to automatically count and weigh items as they traverse a specific location. For example, in transportation systems, it is desirable to have the ability to count the number of wheels and axles on a vehicle for classification purposes. Current sensing schemes utilize mechanical "treadle" devices or inductive loops buried in the pavement along with signal processing to estimate these entities. Both of these methods have their drawbacks. The treadles are mechanical devices and, as such, are subject to wear, degradation by the environment, and other issues that make them a high maintenance solution. The loop counting method is indirect and only infers results based on averages. Slight differences in vehicle design and construction will result in the system supplying erroneous counts. Neither of these methods can count the number of wheels, only the number of axles.

SUMMARY

An exemplary apparatus herein includes an elongated conductor, an elongated resistor contacting the elongated conductor, and secondary conductors contacting the elongated resistor. The elongated resistor is positioned between the elongated conductor and the secondary conductors. Further, a cover (e.g., liquid-tight) surrounds the elongated conductor, the elongated resistor, and the secondary conductors The elongated conductor is given this name because it is elongated (e.g., has a length dimension that is greater than its width dimension). For example, the length dimension can be approximately equal to a roadway lane-width (the roadway lane-width is approximately perpendicular to a direction of travel of traffic moving along the roadway) to allow tires passing over the apparatus to be detected. The elongated resistor can comprise, for example, a piezoresistive material, a crystal material, a semiconductor material, a resistive fabric, etc. The elongated resistor can have the same width and length dimensions as the elongated conductor; however, the secondary conductors are not as long, and the secondary conductors are spaced apart and positioned linearly along the length dimension of the elongated resistor.

The electrical resistance of the elongated resistor changes in proportion to an amount of force exerted upon the elongated resistor. The secondary conductors output electrical resistance measurements of corresponding areas of elongated resistor that the secondary conductors contact. A processor (that is operatively connected to the secondary conductors) automatically calculates the number of items (one example of which is tires) applying force at different locations along the length dimension based on such electrical resistance measurements output by the secondary conductors to produce a count of the items (e.g., tires).

The processor also automatically calculates the force applied to the elongated resistor based on the electrical resistance measurements output by the secondary conductors to simultaneously produce different weight measurements for each of the tires. More specifically, this force is exerted against the cover and transmitted to the elongated resistor through either the elongated conductor and/or the secondary conductors. Thus, the processor can automatically determine if the different weight measurements for each of the tires are within previously established limits to produce an alarm if any of the tires are outside such previously established limits. This allows the processor to automatically output the count of the tires, the different weight measurements of the tires, and the alarm (if appropriate).

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As noted above, conventional systems count axles and do not detect individual tires or wheels without using multiple sensors. The devices disclosed herein address this by providing a reliable, direct measure of wheel and axel counts, using a single elongated sensor. The sensors and systems disclosed herein use a base conductive layer separated from a segmented conductive top layer by a pressure sensitive layer whose resistance changes proportionally to the applied force. As the vehicle rolls over the sensor, the wheels simultaneously compress different segments of the single sensor, creating a signal pattern. The number of wheels can be directly counted (and their weights can be calculated) based on the areas that are compressed. The number of axels is counted by the timing between subsequent sets of wheel "impressions." Further, the vehicle classification parameters are determined by the number and grouping of signals from the sensor.

Figure 1:
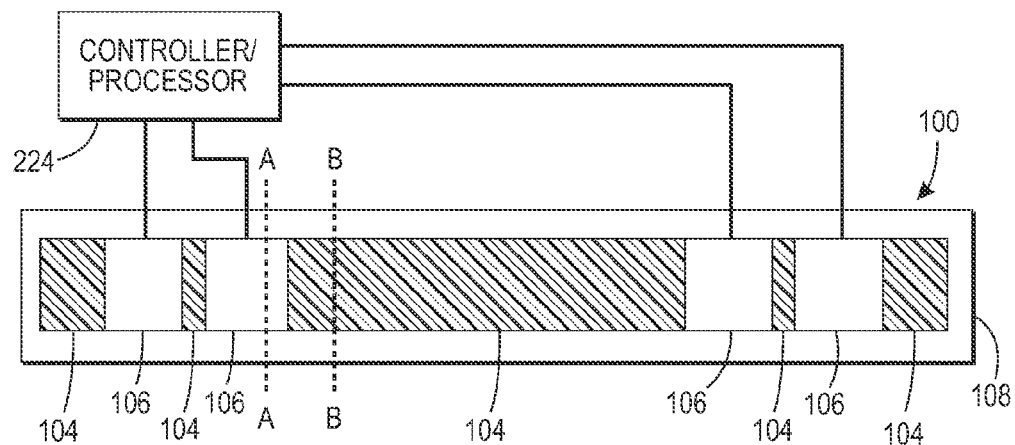
FIG. 1 is a plan view schematic diagram illustrating devices herein.
Figure 2:
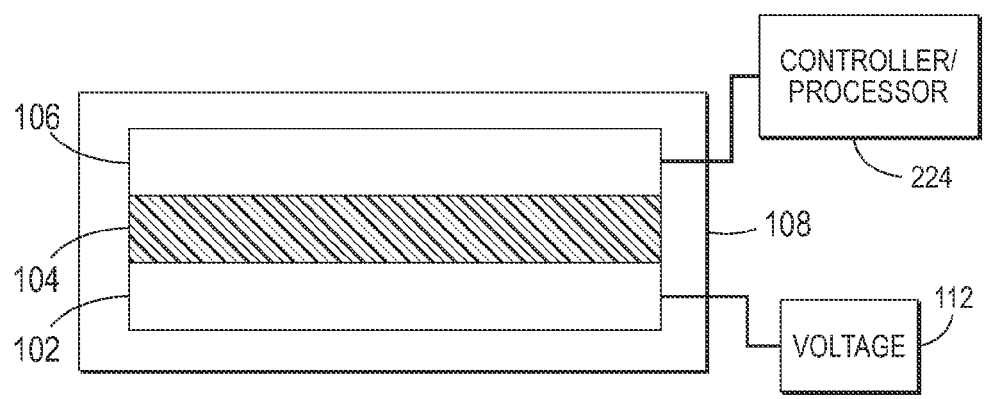
FIG. 2 is a cross-sectional view schematic diagram illustrating a cross-sectional portion of the structure shown in FIG. 1 along line A-A.
Figure 3:
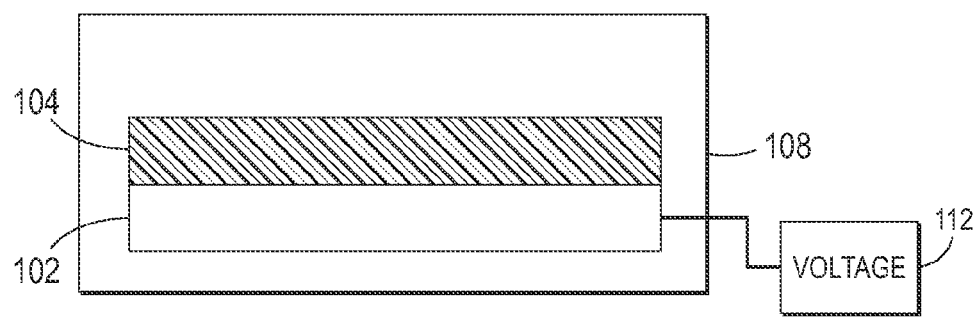
FIG. 3 is a cross-sectional view schematic diagram illustrating a cross-sectional portion of the structure shown in FIG. 1 over a secondary conductor area along line B-B.
Figure 4:
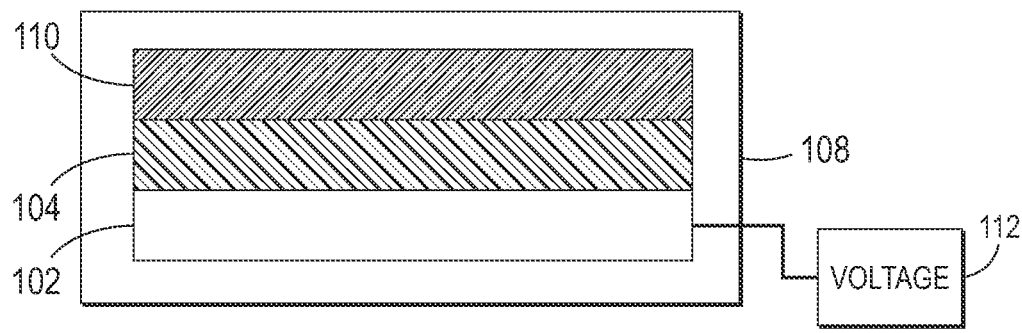
FIG. 4 is a cross-sectional view schematic diagram illustrating a cross-sectional portion of the structure shown in FIG. 1 over an inter-conductor area along line B-B.
Figure 5:
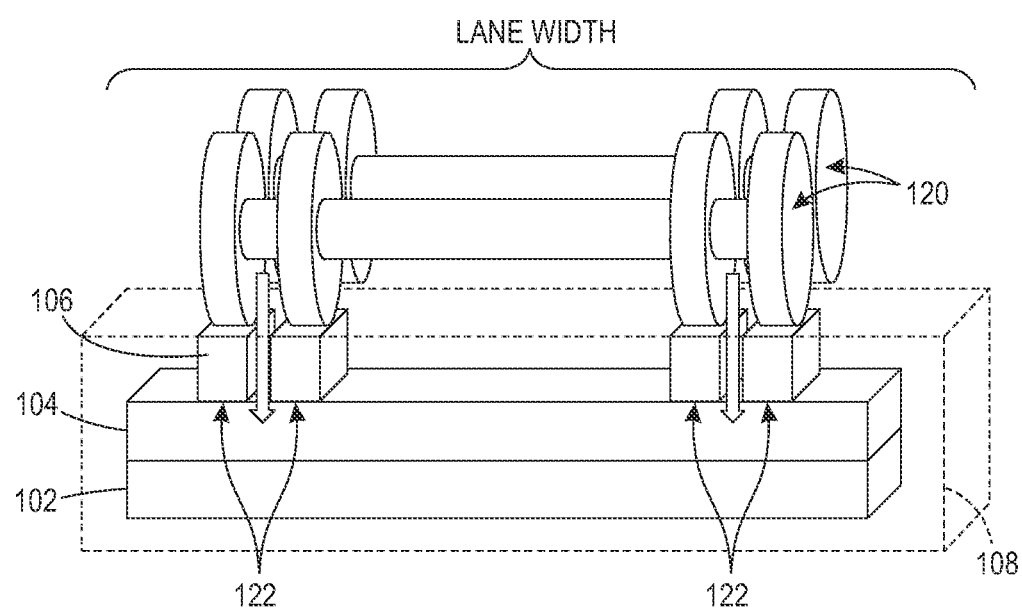
FIG. 5 is a perspective schematic diagram illustrating devices herein.
Figure 6:
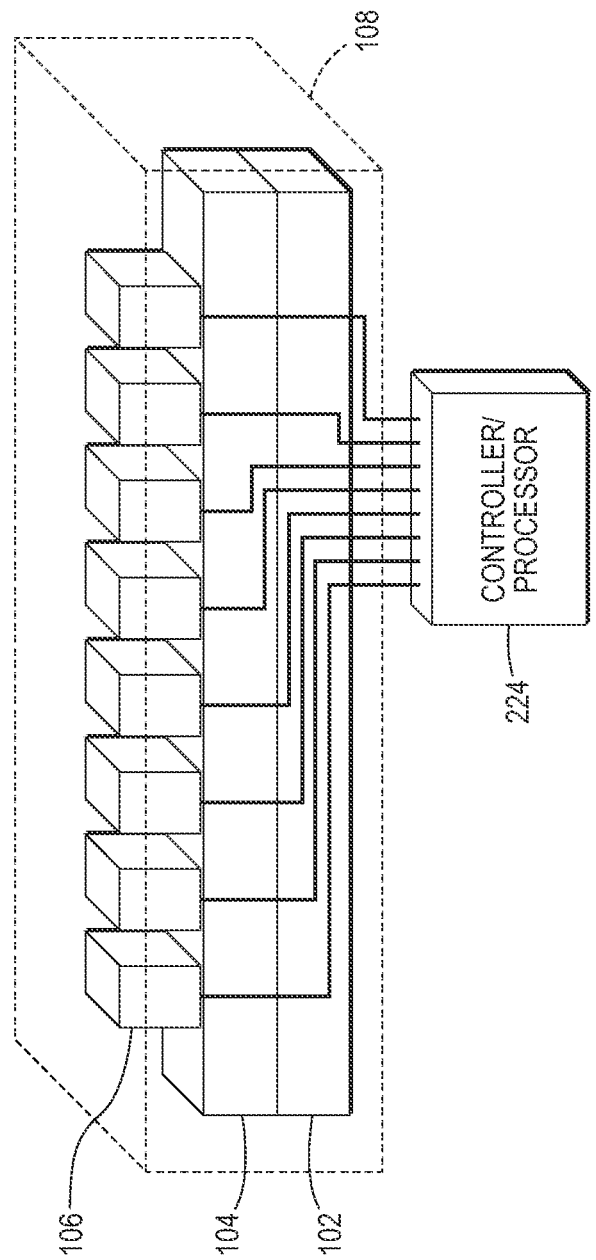
FIG. 6 is a perspective schematic diagram illustrating devices herein.

Referring now to the drawings, FIG. 1 is a plan (or top) view schematic diagram, FIG. 2 is a cross-sectional view schematic diagram illustrating a cross-sectional portion of the structure shown in FIG. 1 along line A-A, FIGS. 3 and 4 are alternative cross-sectional view schematic diagrams illustrating a cross-sectional portion of the structure shown in FIG. 1 along line B-B, and FIGS. 5 and 6 are perspective schematic diagrams. As shown in FIGS. 1-6, exemplary sensors 100 herein include an elongated conductor 102, an elongated resistor 104 contacting the elongated conductor 102, and secondary conductors 106 contacting the elongated resistor 104. The elongated resistor 104 is positioned between the elongated conductor 102 and the secondary conductors 106. Further, a cover 108 (e.g., liquid-tight, air-tight, abrasion resistant, etc.) surrounds the elongated conductor 102, the elongated resistor 104, and the secondary conductors 106

The elongated conductor 102 is given this name because it is elongated (e.g., having a length dimension that is greater than its width dimension, where the length and width are perpendicular to one another). For example, the length dimension can be approximately equal to a roadway lane-width (the roadway lane-width is approximately perpendicular to a direction of travel of traffic moving along the roadway) to allow tires passing over the apparatus to be detected (see FIG. 5).

The elongated resistor 104 can comprise, for example, a piezoresistive material, a crystal material, a semiconductor material, a resistive fabric, etc., or any other material that variably changes resistance as different compressive forces are exerted upon the material (including all such materials that are currently known or those that are developed in the future). The elongated resistor 104 does more than simply change between two resistance values (e.g., on and off) but instead exhibits all values measurable on a scale between a resistance maximum and minimum (potentially hundreds or thousands of different, graduated resistances). The elongated resistor 104 can have the same width and length dimensions as the elongated conductor 102 (or it can be slightly smaller or bigger); however, the secondary conductors 106 are not as long (in the length dimension) as either the elongated conductor 102 or elongated resistor 104, and the secondary conductors 106 are spaced apart and positioned linearly along the length dimension of the elongated resistor 104.

The electrical resistances of different areas (e.g., sections, portions, etc.) of the single elongated resistor 104 change (increases or decreases) independently, relative to other areas of the single elongated resistor 104, and change in proportion to the amount of (or change in) force exerted upon each different area of the single elongated resistor 104. The multiple secondary conductors 106 output electrical resistance measurements only of corresponding areas of elongated single resistor 104 that the secondary conductors 106 contact.

More specifically, FIG. 2 illustrates a cross-sectional portion of the plan view structure shown in FIG. 1 along line A-A; and FIGS. 3 and 4 illustrate a cross-sectional portion of the structure shown in FIG. 1 along line B-B. As shown in FIGS. 1-4, the secondary conductors 106 are only positioned above limited areas of the elongated resistor 104. In another alternative shown in FIG. 4, an insulator material 110 can be positioned on the elongated resistor 104 at locations where the secondary conductors 106 are not located. Spacing the secondary conductors 106 apart from one another allows the secondary conductors 106 to simultaneously detect different resistance levels the elongated resistor 104 will produce based upon different forces simultaneously applied to different areas of the elongated resistor 104.

With respect to the resistance measurement, a voltage (or current) is applied to the elongated conductor 102 (using any form of power unit 112). More of this voltage (current) will flow through the elongated resistor 104 to the secondary conductors 106 as the resistance of the local area of the elongated resistor 104 decreases (and vice versa). The processor 224 is connected to the secondary conductors 106 through wiring, contacts, wirelessly, etc.; and the processor 224 calculates the amount of resistance exhibited by the elongated resistor 104 based upon the voltage (current) difference between the elongated conductor 102 and the secondary conductors 106 simultaneously at each specific location of the elongated resistor 104 where the secondary conductors 106 are located. Again, as different amounts of force are simultaneously exerted upon the different areas of the single elongated resistor 104, these different areas of the single elongated resistor 104 will simultaneously exhibit multiple different resistances, and these different resistances are simultaneously detected by different measures (e.g., voltage or current) received by each of these secondary conductors 106, as determined by the processor 224.

Through empirical testing, a relationship is established between different voltages or currents, different resistance value changes, etc., and force or weight. These relationships are stored in a file, table, database, etc., locally or remotely (e.g., in storage 220 in FIG. 7) to allow processors to translate voltage readings into resistance values, and eventually into weights. These previously determined relationships allow the processor 224 to convert a resistance measure detected at one of the secondary conductors 106 into a weight measure. This allows the single sensor 100 to not only simultaneously count the number of items passing over the sensor 100, but to also simultaneously calculate the weight of each individual item that simultaneously makes contact with the sensor 100, even as a large number of items simultaneously pass across the sensor 100.

FIG. 5 illustrates a tandem truck axle 120 moving along a lane (having a lane width) and the tires of the tandem truck axle 120 directly or indirectly applying a downward force to the secondary conductors 106 (as shown by the block arrows). Note that, for purposes herein, the terms "wheels" and "tires" are used interchangeably and are intended to indicate both the rubber and the metal portion of any wheel assembly that applies force to the sensor 100.

Further, while vehicle tires are used in some of the examples, the sensors 100 herein can detect the number and weight of any items including people walking, people biking, cars, trucks, animals, etc. Therefore, for example, in some installations the sensors have a width large enough to cover the stride length of an animal or human to provide a count and weight measure of animals or humans being loaded into weight restricted areas (such as bridges, airplanes, trucks, elevators, etc.). Further, in most installations, the single sensor has a length sized to reach across the full width of any passageway (hallway, roadway lane, bridge, jetway, loading ramp, door opening, etc.) to count and weigh all items that move along such a passageway.

This is to be contrasted with elongated sensors that do not distinguish between multiple simultaneous contacts because such sensors only provide a single count when multiple items simultaneously contact the sensor (such as when a multi-wheel axle passes over a simple on-off counting sensor that only counts the number of axles). Therefore, the systems and devices herein simultaneously provide counts and weights of multiple items that simultaneously contact different areas of a single sensor, avoiding the need to utilize multiple sensors (such as multiple weight sensors in combination with multiple counting sensors). By providing a single sensor that can simultaneously count and weigh different items simultaneously exerting force against the sensor as they pass over the sensor, the systems and devices herein simplify the structure, reduce costs, decrease pollution, decrease waste, increase yield, and provide simpler and more satisfactory result for the user.

As shown in the specific tandem axle example used herein, in FIG. 5 these secondary conductors 106 transmit the force placed on them to the elongated resistor 104 to compress areas of the elongated resistor 104, as indicated by reference numbers 122. These compressed areas 122 of the elongated resistor 104 will experience a change in resistance relative to the remainder of the elongated resistor 104 (which does not change in resistance) because of the force of the tires of the tandem truck axle 120. The processor 224 detects this amount of change in resistance, and the processor 224 calculates the amount of force (weight) based on this change in resistance.

Thus, the processor 224 (that is operatively connected to the secondary conductors 106) automatically calculates the number of items (one example of which is tires) applying force at different locations along the length dimension based on such electrical resistance measurements output by the secondary conductors 106 to produce a count of the items (e.g., tires in this example).

The processor 224 also automatically calculates the amount of force applied to the elongated resistor 104, based on the electrical resistance change measurements output by the secondary conductors 106, to simultaneously produce different weight measurements for each of the tires. More specifically, this force is exerted by the truck tires against the roadway, the cover 108, etc., and transmitted to the elongated resistor 104 through either the elongated conductor 102 and/or the secondary conductors 106.

Thus, the processor 224 can automatically determine if the different weight measurements for each of the tires are within previously established limits to produce an alarm if any of the tires are outside such previously established limits (or if the combined weight of all tires exceeds a limit). Different utilizations of these sensors 100 allow the processor 224 to generate many types of alarms.

For example, if one of the tires exerts a force that is different (by an amount that exceeds a limit e.g., 10%, 25%, 40%, or any other predetermined limit, etc.) than the other simultaneously weighed tires, this may indicate that one of the tires is low on air pressure, and the alarm that is produced by the processor specifically identifies the tire that is suspected of being low on air pressure. Similarly, if the trailer is improperly loaded, as indicated by the right set of tires exerting more force (that exceed a relative limit) then the left set of tires, an alarm is produced by the processor warning the operator to redistribute the load within the trailer.

In other examples, passengers can be counted and weighed as they move along a jetway while they are boarding a plane. This single sensor is used to verify the number of passengers who have boarded the plane (passenger count) and their combined weight to ensure that a safe flight within weight limits can be performed. The same process is also used to verify the number and weight of items of luggage loaded onto the plane.

In additional examples, the number and weight of individuals or livestock loaded onto an elevator, commercial lift, commercial crane, ramp, etc., can be count verified and weight checked to make sure that capacity of the lifting device is not exceeded.

While a limited number of examples of the use of the disclosed sensor 100 have been provided, those ordinarily skilled in the art would understand that the single sensor can be used to simultaneously count and weigh any items that can be positioned to exert force against the sensor 100. This allows the processor 224 to automatically output the count of the items, the different weight measurements of the items, and the alarm (if appropriate).

Figure 7:
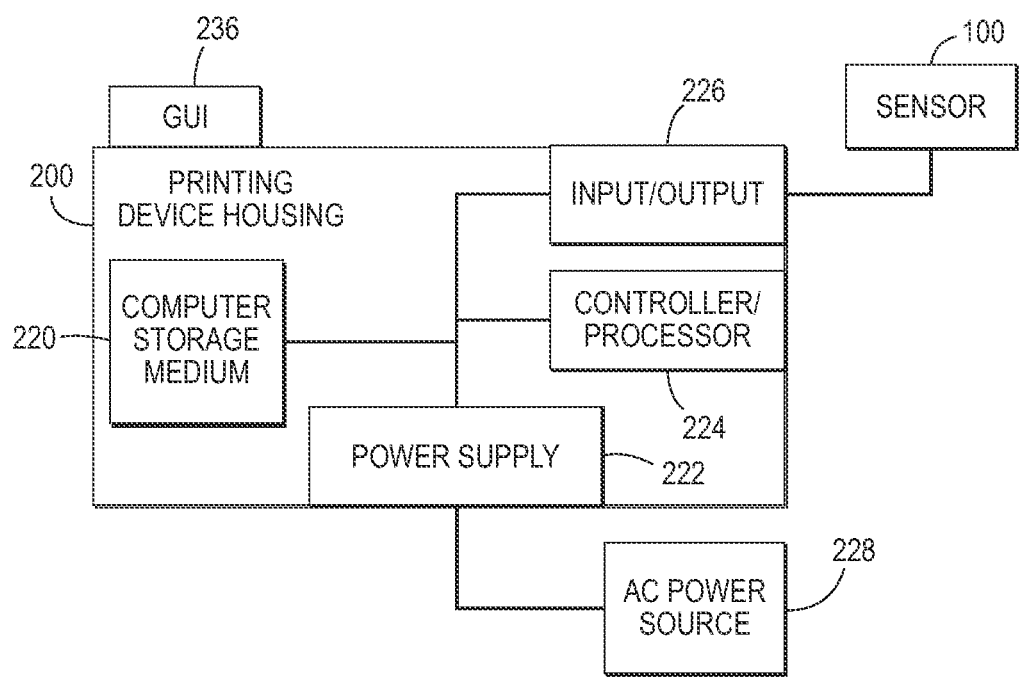
FIG. 7 is a schematic diagram illustrating systems herein.

FIG. 7 illustrates a computerized device 200, which can be used with systems and methods herein and can comprise, for example, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 7, a body housing has one or more functional components that operate on power supplied from an alternating current (AC) source 228 by the power supply 222. The power supply 222 can comprise a power storage element (e.g., a battery, etc).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc.) are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A sensor apparatus comprising:
   an elongated conductor having a width dimension, and having a length dimension that is greater than said width dimension;
   a single elongated resistor contacting said elongated conductor, said single elongated resistor having said width dimension and said length dimension;
   secondary conductors contacting said single elongated resistor, said secondary conductors being spaced apart and positioned linearly along said length dimension of said single elongated resistor, said single elongated resistor being positioned between said elongated conductor and said secondary conductors;
   a cover surrounding said elongated conductor, said single elongated resistor, and said secondary conductors; and
   a processor operatively connected to said secondary conductors,
   an electrical resistance of said single elongated resistor changing in proportion to an amount of force exerted upon said single elongated resistor,
   said secondary conductors outputting electrical resistance measurements of corresponding areas of said single elongated resistor that said secondary conductors contact,
   said processor automatically calculating force applied to said single elongated resistor based on said electrical resistance measurements to produce different weight measurements for different locations along said length dimension, and
   said processor automatically outputting said different weight measurements detected at each of said different locations along said length dimension.

2. The sensor apparatus according to claim 1, said processor producing said different weight measurements simultaneously.

3. The sensor apparatus according to claim 1, said force being applied to said corresponding areas of said single elongated resistor comprising force exerted against said cover and transmitted to said single elongated resistor through one of said elongated conductor and said secondary conductors.

4. The sensor apparatus according to claim 1, said cover comprising a liquid-tight cover.

5. The sensor apparatus according to claim 1, said single elongated resistor comprising one of a piezoresistive material, a crystal material, a semiconductor material, and a resistive fabric.

6. A sensor apparatus comprising:
   an elongated conductor having a width dimension, and having a length dimension that is greater than said width dimension;
   a single elongated resistor contacting said elongated conductor, said single elongated resistor having said width dimension and said length dimension;
   secondary conductors contacting said single elongated resistor, said secondary conductors being spaced apart and positioned linearly along said length dimension of said single elongated resistor, said single elongated resistor being positioned between said elongated conductor and said secondary conductors;
   a cover surrounding said elongated conductor, said single elongated resistor, and said secondary conductors; and
   a processor operatively connected to said secondary conductors,
   an electrical resistance of said single elongated resistor changing in proportion to an amount of force exerted upon said single elongated resistor,
   said secondary conductors outputting electrical resistance measurements of corresponding areas of single elongated resistor that said secondary conductors contact,
   said processor automatically calculating a number of items applying force at different locations along said length dimension based on said electrical resistance measurements to produce a count of said items,
   said processor automatically calculating force applied to said single elongated resistor based on said electrical resistance measurements to produce different weight measurements for each of said items, and
   said processor automatically outputting said count of said items and said different weight measurements of said items.

7. The sensor apparatus according to claim 6, said processor producing said different weight measurements simultaneously.

8. The sensor apparatus according to claim 6, said force being applied to said corresponding areas of said single elongated resistor comprising force exerted against said cover and transmitted to said single elongated resistor through one of said elongated conductor and said secondary conductors.

9. The sensor apparatus according to claim 6, said cover comprising a liquid-tight cover.

10. The sensor apparatus according to claim 6, said single elongated resistor comprising one of a piezoresistive material, a crystal material, a semiconductor material, and a resistive fabric.

11. A sensor apparatus comprising:
    an elongated conductor having a width dimension, and having a length dimension approximately equal to a passageway lane-width, said passageway lane-width being approximately perpendicular to a direction of travel along said passageway, said length dimension being greater than said width dimension;
    a single elongated resistor contacting said elongated conductor, said single elongated resistor having said width dimension and said length dimension;
    secondary conductors contacting said single elongated resistor, said secondary conductors being spaced apart and positioned linearly along said length dimension of said single elongated resistor, said single elongated resistor being positioned between said elongated conductor and said secondary conductors;
    a cover surrounding said elongated conductor, said single elongated resistor, and said secondary conductors; and
    a processor operatively connected to said secondary conductors,
    an electrical resistance of said single elongated resistor changing in proportion to an amount of force exerted upon said single elongated resistor,
    said secondary conductors outputting electrical resistance measurements of corresponding areas of single elongated resistor that said secondary conductors contact,
    said processor automatically calculating a number of tires applying force at different locations along said length dimension based on said electrical resistance measurements to produce a count of said tires,
    said processor automatically calculating force applied to said single elongated resistor based on said electrical resistance measurements to produce different weight measurements for each of said tires, and said processor automatically outputting said count of said tires and said different weight measurements of said tires.

12. The sensor apparatus according to claim 11, said processor producing said different weight measurements simultaneously.

13. The sensor apparatus according to claim 11, said force being applied to said corresponding areas of said single elongated resistor comprising force exerted against said cover and transmitted to said single elongated resistor through one of said elongated conductor and said secondary conductors.

14. The sensor apparatus according to claim 11, said cover comprising a liquid-tight cover.

15. The sensor apparatus according to claim 11, said single elongated resistor comprising one of a piezoresistive material, a crystal material, a semiconductor material, and a resistive fabric.

16. A sensor system comprising:
an elongated conductor having a width dimension, and having a length dimension approximately equal to a roadway lane-width, said roadway lane-width being approximately perpendicular to a direction of travel along said roadway, said length dimension being greater than said width dimension;
a single elongated resistor contacting said elongated conductor, said single elongated resistor having said width dimension and said length dimension;
secondary conductors contacting said single elongated resistor, said secondary conductors being spaced apart and positioned linearly along said length dimension of said single elongated resistor, said single elongated resistor being positioned between said elongated conductor and said secondary conductors;
a cover surrounding said elongated conductor, said single elongated resistor, and said secondary conductors; and
a processor operatively connected to said secondary conductors,
an electrical resistance of said single elongated resistor changing in proportion to an amount of force exerted upon said single elongated resistor,
said secondary conductors outputting electrical resistance measurements of corresponding areas of single elongated resistor that said secondary conductors contact,
said processor automatically calculating a number of tires applying force at different locations along said length dimension based on said electrical resistance measurements to produce a count of said tires,
said processor automatically calculating force applied to said single elongated resistor based on said electrical resistance measurements to produce different weight measurements for each of said tires,
said processor automatically determining if said different weight measurements for each of said tires are within previously established limits to produce an alarm if any of said tires are outside said previously established limits, and
said processor automatically outputting said count of said tires, said different weight measurements of said tires, and said alarm.

17. The sensor system according to claim 16, said processor producing said different weight measurements simultaneously.

18. The sensor system according to claim 16, said force being applied to said corresponding areas of said single elongated resistor comprising force exerted against said cover and transmitted to said single elongated resistor through one of said elongated conductor and said secondary conductors.

19. The sensor system according to claim 16, said cover comprising a liquid-tight cover.

20. The sensor system according to claim 16, said single elongated resistor comprising one of a piezoresistive material, a crystal material, a semiconductor material, and a resistive fabric.

* * * * *